| United States Patent [19] | [11] Patent Number: 4,769,407 |
|---|---|
| Obrecht et al. | [45] Date of Patent: Sep. 6, 1988 |

[54] ELASTOMERIC MASS OF POLYCHLOROPRENE SOL AND POLYCHLOROPRENE GEL

[75] Inventors: Werner Obrecht, Moers; Peter Wendling; Wilhelm Göbel, both of Leverkusen; Eberhard Müller, Dormagen, all of Fed. Rep. of Germany

[73] Assignee: Bayer Aktiengesellschaft, Leverkusen, Fed. Rep. of Germany

[21] Appl. No.: 926,125

[22] Filed: Nov. 3, 1986

[30] Foreign Application Priority Data

Nov. 13, 1985 [DE] Fed. Rep. of Germany ....... 3540143

[51] Int. Cl.$^4$ .......................... C08K 5/39; C08K 5/38; C08L 11/02
[52] U.S. Cl. .................................... 524/108; 524/202; 524/519
[58] Field of Search ................ 524/108, 202, 519, 834

[56] References Cited

U.S. PATENT DOCUMENTS

| 2,234,215 | 3/1941 | Youker | 526/295 |
|---|---|---|---|
| 2,430,562 | 11/1947 | Fryling | 526/220 |
| 3,674,733 | 7/1972 | Ayella | 524/519 |

Primary Examiner—Christopher Henderson
Attorney, Agent, or Firm—Connolly and Hutz

[57] ABSTRACT

An elastomeric mass of polychloroprene sol and polychloroprene gel in proportions in the range of 95:5 to 25:75% by weight in which the polychloroprene sol is free from sulphur and the polychloroprene gel used is a sulphur-containing gel with xanthate or carbamate functions has better processing characteristics than the pure sol component without the expected deterioration in the mechanical properties of the vulcanisates prepared from the mass.

4 Claims, No Drawings

ELASTOMERIC MASS OF POLYCHLOROPRENE SOL AND POLYCHLOROPRENE GEL

This invention relates to an elastomeric mass of polychloroprene sol and polychloroprene gel with improved properties for practical application and the preparation thereof.

Sol-gel mixtures of polychloroprenes are known. The addition of a gel component to the sol improves the processing properties (e.g. expansion after extrusion) of the rubber mixtures but impairs the mechanical properties of the vulcanisates, in particular their strength.

Numerous proposals have been made for preserving the good processing characteristics of the sol-gel mixture without impairing the mechanical properties of the sol component in the mixture (U.S. Pat. No. 3,655,827, DE-OS No. 2,536,372, U.S. Pat. No. 4,485,216). These proposals either solve the problem only partly or are based on very special solutions which render the product uneconomical.

The problem therefore arose of providing new sol-gel mixtures which could be easily processed and showed no impairment in the mechanical properties over a wide mixing range.

This problem is solved according to the invention by mixing a sulphur-containing gel polymer carrying xanthate or carbamate functions with a sulphur-free sol polymer in proportions within the range of 5:95 to 75:25, preferably 10:90 to 50:50 % by weight (based on dry polymers).

The terms "sulphur-containing" and "sulphur-free" denote that polymerisation is carried out in the presence or absence of elementary sulphur or a conventional sulphur donor. Polymers carrying sulphur-containing end groups, for example due to having been prepared with the aid of persulphates as initiators, are therefore not regarded as sulphur-containing.

The present invention thus relates to elastomeric masses of polychloroprene sol and polychloroprene gel in proportions within the range of 95:5 to 25:75, preferably 90:10 to 50:50% by weight, in which the polychloroprene sol is sulphur-free, characterised in that the polychloroprene gel used is a sulphur-containing gel carrying xanthate or carbamate functions.

It is preferred to use a polychloroprene gel for which the copolymerisation of chloroprene, sulphur and optionally other monomers capable of copolymerising with chloroprene is carried out in aqueous emulsion with the aid of a peroxo activator in the presence of xanthates or dithiocarbamates whose anions correspond to the formulae

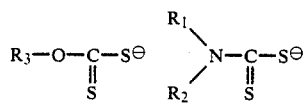

wherein $R_1$, $R_2$ and $R_3$ denote an optionally substituted alkyl, cycloalkyl or aryl group and $R_1$ and $R_2$ may also combine with the nitrogen atom to form a ring optionally containing at least one further hetero atom, the formation of gel being brought about by the incorporation of a cross linking substance and/or by a high conversion rate.

The dithiocarbamates and xanthates are preferably used in the form of their ammonium or alkali metal salts, in particular their sodium or potassium salts.

$R_1$ and $R_2$ preferably stand for $C_1$-$C_4$ alkyl and $R_3$ preferably stands for $C_1$-$C_8$ alkyl or 2,2-(2,4-dioxapentamethylene)-butyl.

It is preferred to use from 0.05 to 5.0% by weight, in particular from 0.1 to 3.0% by weight of sodium dibutyl dithiocarbamate, based on the quantity of monomers of the gel polymers, or a corresponding molar quantity of another dithiocarbamate or from 0.1 to 5.0% by weight, in particular from 0.5 to 3.0% by weight of potassium ethyl xanthate, based on the quantity of monomers of the gel polymer, or a corresponding molar quantity of another xanthate.

The latex particles are cross linked by conventional methods either during polymerisation or in a cross linking stage following the stage of polymerisation. In the simplest case, cross linking is achieved by polymerisation to high conversion or, in a monomer inflow process, by polymerisation at high internal conversion (DE-AS No. 1,248,921). Preparation of the gel may also be carried out by copolymerisation with multifunctional comonomers or the use of multifunctional comonomers in combination with high conversions.

The following multifunctional comonomers may be used: divinyl benzene, divinyl ether, divinyl sulphone, diallyl phthalate, triallyl cyanurate, triallyl isocyanurate, 1,2-polybutadiene, N,N'-m-phenylene-dimaleimide, and triallyl trimellitate. Acrylates and methacrylates of polyfunctional alcohols are preferably used. Preferred polyfunctional alcohols include ethylene glycol, butane diol, hexane diol, polyethylene oxide diol, trimethylol propane, tetramethylol methane and other compounds mentioned in DE-AS No. 1,720,107, U.S. Pat. Nos. 3,714,296 and 3,849,519. Cross linking of the latex particles after polymerisation is also a possibility. Examples of this procedure include the methods indicated in DE-AS No. 1,229,716, U.S. Pat. No. 3,147,318 and DE-AS No. 1,247,666. The quantity of comonomer used and the other measures should result in a gel content of the cross linked latex of from 40% to 100%, preferably from 60% to 99%, and to a swelling index of the gel component of from 5 to 90, preferably from 10 to 60. The gel content and swelling index are determined in toluene by the method described hereinafter.

Sulphur is preferably used in quantities of 0.05 to 2.0% by weight, based on the monomers, in particular 0.1 to 0.7% by weight, and preferably in the form of an aqueous dispersion.

The usual sulphur donors may be used in corresponding quantities instead of sulphur.

Examples of suitable peroxo activators include persulphates, perborates, percarbonates, perphosphates and $H_2O_2$ and in particular the water soluble salts of peroxodisulphuric acid, which are preferred. The activators are preferably put into the process in a molar quantity corresponding to 0.03 to 3.0% by weight, in particular 0.1 to 1.0% by weight of potassium peroxodisulphate, based on the quantity of monomers.

5 to 30% of the total quantity of peroxo activator is preferably added at the onset of polymarisation and the remaining 70 to 95% during polymerisation, either portion-wise or continuously.

Sodium-anthraquinone-2-sulphonate is preferably used in addition in a quantity of 0.005 to 0.1% by weight, based on the monomers. It is added as a solution together with the peroxo activator or preferably introduced quantitatively into the polymerisation mixture prior to activation.

Polymerisation is carried out at temperatures from −10° C. to 70° C., preferably at 0° to 50° C.

Xanthogen disulphides and preferably mercaptans are used as regulators.

Suitable agents for stopping polymerisation are, for example, pyrocatechol and, preferably, diethyl hydroxylamine, which is used in a quantity of 0.05 to 0.15% by weight, based on the monomers, preferably in the form of an aqueous solution.

Conventional stabilisers such as sterically hindered phenol derivatives, amines, phosphites, xanthogen disulphides or thiuramic disulphides are used to improve the storage stability of the polymers. Tetraalkyl thiuramic disulphides are preferred, optionally in combination with compounds from the other classes of substances.

These compounds are added to the latex as aqueous dispersions, organic solutions or aqueous emulsions of an organic solution before or after removal of unreacted monomers.

Up to 6% by weight of tetraethyl thiuramic disulphide (TETD) or a corresponding molar quantity of another compound or compound mixture may be used. The mixing of the sulfur-containing gel polymer and the uncrosslinked sol polymer is preferably performed in the latex state before the isolation of the dry polymers.

EXAMPLES (a) Preparation of the gel components

The gel components of series (1) to (6) were prepared according to the following basic formulation (batch experiments, quantities given in parts by weight):

| | |
|---|---|
| Chloroprene and comonomer | 100 |
| Salt free water (total quantity) | 128 to 133 |
| Sodium salt of disproportionated abietic acid | 3.5 |
| Sodium salt of the condensation product of naphthalene sulphonic acid and formaldehyde | 0.7 |
| KOH | 0.5 |
| $K_2S_2O_8$ | 0.07 to 0.50 |
| Sodium salt of anthraquinone sulphonic acid | 0.03 |
| Sulphur | 0.5 |
| Sodium dibutyl dithiocarbamate (DBDTC) | 0.13 to 2.0 |
| TETD | 1.0 to 4.0 |

In the experiments of series (3) to (6), ethylene glycol dimethacrylate (EGDM) was used in addition as cross linking agent. (Total monomer quantity again 100 parts by weight).

The batch experiments were carried out in a reactor with stirrer. The aqueous phase consisting of 120 parts of water, disproportionated abietic acid, sodium salt of naphthalene sulphonic acid containing methylene bridges and KOH was introduced into this vessel, flushed with nitrogen and heated to the temperature indicated in the tables. The monomer or monomers flushed with nitrogen were then added. In the examples containing cross linking agent, the latter was dissolved in the monomer. After adjustment to the temperature indicated in the Tables, the sulphur was added as a 50% by weight aqueous dispersion and DBDTC as a 30% by weight aqueous solution. The sulphur dispersion had the following composition:

50% by weight sulphur
49% by weight water
0.82% by weight dispersing agent (based on cellulose ether)
0.08% by weight zinc oxide
0.10% by weight magnesium oxide.

The reaction was then initiated with a small quantity of a dilute aqueous $K_2S_2O_8$ solution which had been flushed with nitrogen, and polymerisation was sustained during the experiment by further addition of this aqueous, nitrogen-flushed persulphate solution. The quantity of water given in the basic formulation is made up of the original quantity of water put into the process and the water added with the aqueous solutions and dispersions of the reactants. The quantities of persulphate required for obtaining the given conversion rates are shown in the Tables.

The conversion rate is checked gravimetrically. In the batch experiments, the reaction was stopped with 0.03 parts by weight, based on the latex, of an aqueous, 2.5% by weight solution of diethyl hydroxylamine, and tetraethyl thiuramic disulphide (TETD) was added to the latex in the quantity indicated in the Tables. TETD was used as a 25% by weight emulsion in toluene.

The latex was degasified to a residual chloroprene content (based on the latex) of about 500 ppm.

The continuous production of gel components was carried out in a cascade of 5 vessels. The dwell time in each of the 5 vessels, which were equal in size, was 0.5 hours. The monomers, aqueous phase and activators were introduced into the first reactor in three separate streams.

The individual phases had the following compositions (parts by weight):

| | |
|---|---|
| Monomer phase | |
| chloroprene | ⎫ |
| 2,3-dichlorobutadiene | ⎬ together 100 |
| EGDM | ⎭ |
| phenothiazine | 0.01 |
| Aqueous phase | |
| salt free water | 102 |
| sodium salt of disproportionated abietic acid | 3.5 |
| KOH | 0.42 |
| sodium salt of the condensation product of naphthalene sulphonic acid and formaldehyde | 0.7 |
| sodium salt of anthraquinone-2-sulphonic acid | 0.06 |
| sulphur | 0.5 |
| DBDTC | 0.13–1.0 |
| TETD | 1.0 to 2.0 |
| Activator solution | |
| Potassium peroxodisulphate | 0.26 to 0.36 added as a 1.2% by weight aqueous solution. |

The activator was fed separately into vessels 1 to 4. The distribution of the conversion rate over the individual vessels and the final degree of conversion could be adjusted by the quantity of persulphate added.

Below are given two examples of adjustments to different final conversions:

| Experiment without cross linking agent (EGDM): | | |
|---|---|---|
| Reactor | $K_2S_2O_8$ supply (parts by weight) | Total conversion (%) |
| 1 | 0.08 | 54 |
| 2 | 0.07 | 80 |

-continued

| | | |
|---|---|---|
| 3 | 0.06 | 92 |
| 4 | 0.05 | 95 |
| 5 | — | 95 |

| Experiment with cross linking agent: (EGDM): | | |
|---|---|---|
| Reactor | $K_2S_2O_8$ (parts by weight) | Total conversion (%) |
| 1 | 0.15 | 42 |
| 2 | 0.09 | 69 |
| 3 | 0.08 | 83 |
| 4 | 0.04 | 90 |
| 5 | — | 90 |

TETD was fed into the 5th vessel of the cascade as a 15% by weight solution in chloroprene.

In a separate stirrer vessel, polymerisation was continuously stopped with 0.1 parts by weight of diethyl hydroxylamine introduced as a 2.5% by weight aqueous solution. Degasification of the continuously produced latices was carried out as in the batch experiments.

The gel components of comparison series (1) and (2) were prepared according to DE-PS No. 1,720,107, DE-OS No. 3,120,792 and DE-OS. No. 3,123,905.

The gel component used in the comparison example in series (8) was prepared according to DE-OS No. 3,234,318, Example 5.

(b) Preparation of the sol components

The sol component of series (2) (experiments (a–d), (4), (5), (6) and (7) and of the comparison series (1) and (2) was prepared according to DE-OS No. 3,002,711, example 13. The sol component of series (2) (experiments (e–h) and series (8) (example 1) was prepared according to DE-OS No. 2,306,610 (polymerisation example II). The sol component of the comparison example in series (8) was prepared according to DE-OS No. 3,234,318, example 2.

(c) Preparation and working up of the sol-gel mixtures

The degasified latex of the polychloroprene gel was mixed with the degasified latex of the polychloroprene sol in the given proportions (see tables). The latex mixture was adjusted to pH 6.5 with a 20% by weight acetic acid and the polymer was isolated by freezing coagulation and washed with water. The sheets obtained were dewatered to a residual moisture content of about 30% by weight by means of squeezing rollers and dried to a residual moisture content below 0.5% by weight in a circulating air drying cupboard at 70° C.

(d) Characterisation of the crude rubber

The following determinations were carried out on the crude rubber:

Gel content in toluene: 100 to 150 mg of the polymer were left to stand in 20 cm of toluene for 12 to 16 hours and then shaken for 2 hours. The insoluble component was separated by centrifuging, dried and weighed and its quantity recorded as a percentage of the polymer weight.

The swelling index ($Q_i$) of the gel content was calculated from the quantity of toluene ($m_T$) remaining in the gel (after centrifuging at 500,000 m/sec) and the dry weight of the gel ($m_{gel}$):

$$Q_i = m_T/m_{gel}$$

The Mooney viscosity (ML 1+4) was determined at 100° C. according to DIN 53 523, part 1-3.

The processing characteristics were tested on products obtained from the following mixtures:

Mixture 1

100.0 parts by weight of polymer
60.0 parts by weight of carbon black (N 990)
10.0 parts by weight of sodium-aluminium silicate
5.0 parts by weight of aromatic mineral oil
2.0 parts by weight of phenyl -α-naphthylamine
1.0 part by weight of stearic acid
4.0 parts by weight of magnesium oxide Mixture 2

100.0 parts by weight of polymer
50.0 parts by weight of carbon black (N 990)
50.0 parts by weight of carbon black (N 539)
30.0 parts by weight of aromatic mineral oil
2.0 parts by weight of phenyl-α-naphthylamine
1.0 part by weight of stearic acid
1.0 part by weight of paraffinic anti-ozonant wax
4.0 parts by weight of magnesium oxide.

Mixture 3

100.0 parts by weight of polymer
25.0 parts by weight of carbon black (N 990)
25.0 parts by weight of carbon black (N 539)
15.0 parts by weight of aromatic mineral oil
2.0 parts by weight of phenyl-α-naphthylamine
1.0 part by weight of stearic acid
1.0 part by weight of paraffinic anti-ozonant wax
4.0 parts by weight of magnesium oxide.

Mixture 4

100.0 parts by weight of polymer
10.0 parts by weight of chalk
1.0 part by weight of paraffinic mineral oil
2.0 parts by weight of a mixture of alkylated phenols
0.5 parts by weight of stearic acid
4.0 parts by weight of magnesium oxide.

The processing qualities were tested by the following methods:

Mixtures 1 to 3

1.2 kg of the components of a mixture were mixed at 30° C. in a 1 liter kneader at 30 revs. per min. 200 g of the mixture were extruded through a 4.2 mm die of a Brabender laboratory extruder (10-D screw) at temperatures of 60 (cylinder) to 70° C. (extrusion head) to form a strand of circular cross section on which the swelling after extrusion (in %) was subsequently determined.

Mixture 4

1.2 kg of the components of a mixture were mixed at 30° C. in a 1 liter kneader at 30 revs per min. 300 g of this test mixture were extruded as a band 8 mm in width and 2 mm in thickness by means of a Brabender laboratory extruder (10-D-screw) at temperatures of 70 (cylinder) to 90° C. (extrusion head) to form a Garvey profile according to ASTM-D 2230-78 and the swelling after extrusion (in %) was subsequently determined.

Mixtures 1 to 4

500 g of the test mixture were rotated as a sheet at 30° C. on rollers (320×200 mm) rotating at 20 revs. per min. and separated by a gap of 0.9 mm. Two strips measuring 5×50 cm were cut out of the sheet and left on a small support covered with talcum.

The length was measured after 24 hours and the mean value obtained from two samples recorded as the relaxation (in %).

(e) Testing of vulcanization and of vulcanisate

Vulcanisations were carried out on the basis of two mixtures

Mixture 5 (iso-mixture 2475)

100.0 parts by weight of polymer
30.0 parts by weight of carbon black (N 762)
0.5 parts by weight of stearic acid
2.0 parts by weight of phenyl-β-naphthylamine
4.0 parts by weight of magnesium oxide
5.0 parts by weight of active zinc oxide
0.5 parts by weight of ethylene thiourea

Mixture 6 (DIN 53670, part 5)

100.0 parts by weight of polymer
30.0 parts by weight of carbon black (N 762)
0.5 parts by weight of stearic acid
4.0 parts by weight of magnesium oxide
5.0 parts by weight of active zinc oxide
0.5 parts by weight of ethylene thiourea.

The Mooney scorch (MS) was determined at a temperature of 120° C. according to DIN 53 523 part 4.

The tensile strength, elongation at break and modulus at 300% elongation were determined on the vulcanisate according to DIN 53 504 after a vulcanisation time of 30 minutes.

The tear propagation resistance was determined according to DIN 53 504 on a standard ring R 2. For this test, 2×5 incisions 1 mm in depth placed side by side were made on the inside of the ring. The distance between the incisions was 2 mm. The two groups of five incisions were arranged opposite each other.

The rings with incisions were placed on rollers having the dimensions for the standard ring R 2, see DIN 53 504, table 3, and the rings were subjected to tension in a tension testing machine at a feed rate of 700 mm/min until breakage occurred.

The tear propagation resistance W or structural strength is converted to a nominal thickness of $d_o=4$ mm according to the following equation and the result given in N:

$$W = W_{gem} \cdot \frac{d}{d_o}$$

wherein
W [N] = tear propagation resistance to be found
$W_{gem}$ [N] = tear propagation resistance measured
$d_o$[mm] = nominal thickness
d [mm] = thickness measured.

The mean value of the results obtained from 3 or 6 samples is calculated and the corresponding confidence range for 95% safety indicated according to DIN 53598.

(f) Examples according to the invention and results

Series (1)

In this series, the preparation of sulphurmodified polychloroprene gel without cross linking agent is described. The gel content of the polymer and the swelling index of the gel content are determined by the conversion rate and the quantity of dibutyl dithiocarbamate. The process may be carried out continuously or batch-wise.

Series (2)

The experiments summarised in this series demonstrate that the polychloroprene mixtures prepared according to the invention reach a high level of quality in the combination of properties of their vulcanisates (high tensile strength, high modulus, high tear propagation resistance combined with high surface quality of the extrudates).

Series (1): Preparation of S-modified gels in the presence of dibutyl dithiocarbamate (DBDTC) without cross linking agent

| Batch | continuous | sulphur | DBDTC | temperature (°C.) | conversion (%) | $K_2S_2O_8$ | TETD subsequently added | ML 1 + 4 (ME) | Gel content (%) | Swelling index |
|---|---|---|---|---|---|---|---|---|---|---|
| x | — | 0.5 | 0.25 | 45 | 91 | 0.28 | 1.0 | 118 | 64 | 45 |
| x | — | 0.5 | 0.25 | 45 | 97 | 0.32 | 1.0 | 80 | 69 | 40 |
| x | — | 0.5 | 0.13 | 45 | 98 | 0.29 | 1.0 | 110 | 95 | 38 |
| — | x | 0.5 | 0.13 | 45 | 95 | 0.36 | 1.0 | 115 | 90 | 36 |

Series (2): Conditions of preparation of gels (I to II) prepared with dibutyl dithiocarbamate without cross linking agent and mixed with sol polymers (mixtures a to m) and tested for qualities for practical application

| Experiment | Discontinuous | continuous | sulphur | DBDTC | monomer chloroprene | monomer dichlorobutadiene | Temp. (°C.) | TETD subsequently added | conversion (%) | $K_2S_2O_8$ | Gel content (% by wt) | Swelling index |
|---|---|---|---|---|---|---|---|---|---|---|---|---|
| I | x | — | 0.5 | 0.13 | 98.8 | 1.2 | 45 | 3.0 | 93 | 0.49 | 95 | 25 |
| II | x | — | 0.5 | 0.13 | 98.8 | 1.2 | 45 | 2.0 | 93 | 0.50 | 84 | 45 |

Series (2): Data for practical application of the sol/gel mixtures prepared with gels I. II and III

| Experiment | gel type | sol type | proportions in mixture sol:gel | ML 1 + 4 (ME) | Test mixture | $MS_5$ (min) | Tensile strength (mPa) | elongation at break (%) | M at 300% elongation (mPa) | tear propagation resistance (N) |
|---|---|---|---|---|---|---|---|---|---|---|

-continued

| | | Series (2): Data for practical application of the sol/gel mixtures prepared with gels I, II and III | | | | | | | |
|---|---|---|---|---|---|---|---|---|---|
| a | I | mercaptan | 100:0 | 50 | 5 | 10 | 18.4 | 410 | 13.1 | 161 |
| b | I | regulated | 90:10 | 62 | 5 | 13 | 18.9 | 430 | 12.6 | 166 |
| c | I | regulated | 80:20 | 78 | 5 | 13 | 19.4 | 440 | 12.4 | 200 |
| d | I | regulated | 70:30 | 91 | 5 | 12 | 20.1 | 470 | 12.0 | 206 |
| e | II | xanthogen | 100:0 | 43 | 5 | — | 19.7 | 440 | 12.4 | 157 |
| f | II | disulphide | 90:10 | 53 | 5 | — | 20.4 | 440 | 13.0 | 180 |
| g | II | regulated | 80:20 | 63 | 5 | — | 20.4 | 440 | 13.0 | 179 |
| h | II | ed | 70:30 | 75 | 5 | — | 19.7 | 440 | 12.9 | 165 |

| Experiment | test mixture | relaxation (%) | swelling after extrusion (%) | surface quality |
|---|---|---|---|---|
| b | 1 | 60 | 44 | 1 |
| c | 1 | 60 | 37 | 2 |
| d | 2 | 30 | 30 | 2 |
| f | 3 | 69 | 49 | 2 |
| g | 3 | 68 | 45 | 2 |
| h | 3 | 71 | 42 | 3 |

Series (3)

The preparation of sulphur-modified gels using DBDTC in the presence of EGDM is described in this series. The process of preparation may be carried out discontinuously or continuously. The gel content and swelling index can be adjusted to desired values.

In the range selected, the polymerisation temperature has no substantial influence on the Mooney viscosity, gel content and swelling index of the sulphur modified gel.

Series (4)

In this series, the quantity of cross linking agent (EGDM) is varied. When the results obtained are compared with those of pure, sulphur modified gel, it is found that the Mooney viscosity, gel content and swelling index can be adjusted to desired values by means of the quantity of cross linking agent used. The Mooney viscosity and gel content increase with increasing quantity of cross linking agent while the swelling index decreases.

When the sol/gel mixtures prepared from the gel polymer which has been prepared according to the invention are compared with sol/gel blends prepared according to the state of the art (conparison series 1), the mixtures prepared according to the invention are found to have higher tensile strengths which, in contrast to the comparison Series (1), do not decrease with increasing proportions of gel polymer. In addition, the vulcanisates obtained from mixtures prepared according to the invention have higher tear propagation resistances than the examples of the comparison series.

Series (5)

In this series the quantity of DBDTC is varied. The results obtained with the pure sulphur-modified gel polymer demonstrate that the Mooney viscosity, gel content and swelling index of the gel can be varied by means of the quantity of DBDTC used. As the quantity of DBDTC increases, the Mooney viscosity and the gel content of the gel polymer decrease while the swelling index of the gel increases.

Sol/gel mixtures prepared from the gel polymer produced according to the invention give rise to vulcanisates which have substantially higher tensile strengths than those obtained in comparison series (2) and, in contrast to the values obtained in the comparison series, the tensile strengths do not decrease with increasing proportion of gel polymer in the polymer mixture. The tear propagation resistance values are also substantially higher than in the comparison series (2).

Series (6)

In this example, a gel is prepared at a higher temperature. The data of the pure gel polymer and of the sol/gel mixtures prepared from it correspond to the properties obtained in experiment II.

Series (7)

In this example, the gel is prepared continuously. The data of the pure gel polymer and of the sol/gel mixtures obtained from the polymer correspond to the properties of the discontinuously prepared gel polymers.

The sol/gel mixtures prepared from the gel polymer produced according to the invention have high values for tensile strength and tear propagation resistance even when the gel polymer is prepared continuously.

Series (8)

In this series, the data of sol/gel polymer mixtures Series (8) prepared according to the invention are compared with those of a sol/gel polymer mixture in which both the sol component and the gel component contain elementary sulphur (according to DE-OS No. 3,234,318).

The polymer mixtures prepared according to the invention combine high tensile strength with high modulus of the vulcanisates and good surface properties of the extrudates This combination of properties cannot be obtained with polymer mixtures according to DE-OS No. 3,234,318.

Series (3): Preparation of S-modified gels in the presence fo DBDTC and EGDM

| Discon-tinuous | contin-uous | sulphur | DBDTC | EGDM | Temperature (°C.) | $K_2S_2O_8$ | Conversion (%) | TETD subsequently added | ML 1 + 4 (ME) | Gel content (% by wt) | Swelling index |
|---|---|---|---|---|---|---|---|---|---|---|---|
| x | — | 0.5 | 1.0 | 5.0 | 45 | 0.16 | 82 | 2.0 | 118 | 84 | 14 |
| x | — | 0.5 | 1.0 | 5.0 | 30 | 0.12 | 83 | 2.0 | 120 | 87 | 14 |
| x | — | 0.5 | 1.0 | 5.0 | 30 | 0.07 | 78 | 2.0 | 118 | 86 | 15 |
| — | x | 0.5 | 1.0 | 5.0 | 45 | 0.26 | 80 | 2.0 | 107 | 85 | 11 |
| — | x | 0.5 | 1.0 | 2.0 | 30 | 0.36 | 91 | 2.0 | 118 | 82 | 12 |
| — | x | 0.5 | 1.0 | 4.0 | 30 | 0.36 | 90 | 2.0 | 94 | 88 | 10 |

Series (4): Conditions of preparation of gels (I to III) in which the quantity of cross linking agent was varied and the products obtained by mixing the gels with sol polymers (mixtures a to n) were tested for their properties for practical application.

| Experiment | discontinuous | Continuous | sulphur | DBDTC | EGDM | temperature (°C.) | $K_2S_2O_8$ | Conversion (%) | TGETD subsequently added | ML 1 + 4 (ME) | Gel content in toluene (%) | Swelling index |
|---|---|---|---|---|---|---|---|---|---|---|---|---|
| I | x | — | 0.5 | 1.0 | 2.5 | 30 | 0.11 | 80 | 3.0 | 104 | 72 | 25 |
| II | x | — | 0.5 | 1.0 | 5.0 | 30 | 0.14 | 80 | 3.0 | 108 | 84 | 16 |
| III | x | — | 0.5 | 1.0 | 7.5 | 30 | 0.14 | 80 | 3.0 | 109 | 86 | 13 |

Series (5): Conditions for the preparation of gels IV to VI in which the quantity of peptising agent was varied and the products of their mixtures with sol polymers (mixtures a to n) were tested for their properties for practical application.

| Experiment | discontinuous | continuous | sulphur | DBDTC | EGDM | temperature (°C.) | $K_2S_2O_8$ | Conversion (%) | TETD subsequently added | ML 1 + 4 (ME) | Gel content (%) | Swelling index |
|---|---|---|---|---|---|---|---|---|---|---|---|---|
| IV | x | — | 0.5 | 0.5 | 5.0 | 30 | 0.12 | 80 | 1.0 | 132 | 86 | 12 |
| V | x | — | 0.5 | 1.5 | 5.0 | 30 | 0.24 | 80 | 3.0 | 110 | 84 | 13 |
| VI | x | — | 0.5 | 2.0 | 5.0 | 30 | 0.23 | 80 | 4.0 | 79 | 82 | 14 |

Series (6): Conditions for the preparation of a gel VII which was prepared by the same method as gel II but at a higher temperature and then tested for practical application as mixtures with sol polymer (mixtures a to d)

| Experiment | discontinuous | continuous | sulphur | DBDTC | EGDM | temperature (°C.) | $K_2S_2O_8$ | Conversion (%) | TETD subsequently added | ML 1 + 4 (ME) | Gel content (%) | swelling index |
|---|---|---|---|---|---|---|---|---|---|---|---|---|
| VII | x | — | 0.5 | 1.0 | 5.0 | 45 | 0.17 | 80 | 3.0 | 111 | 82 | 17 |

Series (7): Conditions of preparation of a gel (VIII) prepared by a continuous process and tested for practical application as mixtures with sol polymer (mixtures a to c)

| Experiment | discontinuous | continuous | sulphur | DBDTC | EGDM | Temperature (°C.) | $K_2S_2O_8$ | conversion (%) | TETD subsequently added | ML 1 + 4 (ME) | Gel content in toluene (%) | Swelling index |
|---|---|---|---|---|---|---|---|---|---|---|---|---|
| VIII | — | x | 0.5 | 1.0 | 3.0 | 30 | 0.36 | 90 | 2.0 | 85 | 89 | 13 |

Series (4): Data of properties for practical application of the sol/gel mixtures containing gels I, II and III

| Experiment | gel type | sol type | Proportions of mixture sol:Gel | ML 1 + 4 (ME) | Test Mixture | $MS_5$ (Min) | tensile strength (mPa) | Elongation at break (%) | M at 300% elongation (mPa) | tear propagation resistance (N) |
|---|---|---|---|---|---|---|---|---|---|---|
| a | I | mercap- | 100:0 | 43 | 6 | 12 | 17.6 | 370 | 14.7 | 175 |

| | | | Series (4): Data of properties for practical application of the sol/gel mixtures containing gels I, II and III | | | | | | | |
|---|---|---|---|---|---|---|---|---|---|---|
| b | I | tan | 85:15 | 50 | 6 | 14 | 17.4 | 380 | 14.0 | 148 |
| c | I | regu- | 75:25 | 54 | 6 | 13 | 19.6 | 420 | 13.8 | 213 |
| d | I | lated | 50:50 | 73 | 6 | 12 | 19.1 | 410 | 14.2 | 152 |
| e | I | mercap-tan regu-lated | 25:75 | 91 | 6 | 9 | 18.3 | 370 | 15.6 | 145 |
| f | II | mercap- | 85:15 | 50 | 6 | 12 | 18.5 | 400 | 13.7 | 154 |
| g | II | tan | 75:25 | 51 | 6 | 10 | 18.8 | 420 | 13.2 | 180 |
| h | II | regu- | 50:50 | 66 | 6 | 9 | 18.5 | 420 | 14.2 | 169 |
| i | II | lated | 25:75 | 91 | 6 | 8 | 16.7 | 360 | 14.7 | 142 |
| k | III | mercap- | 85:15 | 48 | 6 | — | 16.2 | 360 | 14.0 | 148 |
| l | III | tan | 75:25 | 52 | 6 | 14 | 18.0 | 400 | 13.4 | 171 |
| m | III | regu- | 50:50 | 59 | 6 | — | 15.6 | 360 | 13.9 | 157 |
| n | III | lated | 25:75 | 75 | 6 | — | 13.7 | 300 | — | 123 |

| Experiment | test mixture | relaxation (%) | swelling after extrusion (%) |
|---|---|---|---|
| b | 4 | 80 | 41 |
| c | 4 | 80 | 39 |
| d | 4 | 78 | 38 |
| e | 4 | 75 | 34 |
| f | 4 | 78 | 44 |
| g | 4 | 78 | 42 |
| h | 4 | 72 | 34 |
| i | 4 | 58 | 25 |
| k | 4 | 79 | 40 |
| l | 4 | 77 | 42 |
| m | 4 | 68 | 37 |
| n | 4 | 52 | 21 |

Series (5): Data for practical application of the sol/gel mixtures in which gels IV, V and VI were used

| Experiment | Gel type | sol type | Proportions of mixture sol:gel | ML 1 + 4 (ME) | test mixture | MS$_5$ (Min) | Tensile strength (mPa) | Elongation at break (%) | M at 300% elongation (mPa) | tear propagation resistance (N) |
|---|---|---|---|---|---|---|---|---|---|---|
| a | IV | mercap- | 100:0 | 42 | 6 | 12 | 17.3 | 370 | 14.4 | 169 |
| b | IV | tan | 85:15 | 52 | 6 | 12 | 18.0 | 390 | 14.0 | 186 |
| c | IV | regulat- | 75:25 | 56 | 6 | 10 | 18.4 | 380 | 14.8 | 174 |
| d | IV | ed | 50:50 | 72 | 6 | 7 | 18.4 | 360 | 16.6 | 184 |
| e | IV | mercap-tan regulat-ed | 25:75 | 104 | 6 | 6 | 17.1 | 330 | — | 147 |
| f | V | mercap- | 85:15 | 47 | 6 | 13 | 18.9 | 390 | 13.8 | 172 |
| g | V | tan | 75:25 | 51 | 6 | 14 | 19.0 | 410 | 13.9 | 192 |
| h | V | regulat- | 50:50 | 63 | 6 | 14 | 17.2 | 400 | 13.4 | 169 |
| i | V | ed | 25:75 | 79 | 6 | 11 | 17.4 | 370 | 14.9 | 172 |
| k | VI | mercap- | 85:15 | 48 | 6 | 15 | 18.3 | 390 | 14.0 | 169 |
| l | VI | tan | 75:25 | 51 | 6 | 12 | 18.8 | 420 | 13.2 | 204 |
| m | VI | regulat- | 50:50 | 58 | 6 | 12 | 17.4 | 420 | 12.6 | 180 |
| n | VI | ed | 25:75 | 71 | 6 | 12 | 15.5 | 370 | 13.7 | 137 |

| Experiment | Test mixture | relaxation (%) | swelling after extrusion (%) |
|---|---|---|---|
| b | 4 | 79 | 41 |
| c | 4 | 78 | 38 |
| d | 4 | 72 | 33 |
| e | 4 | 62 | 22 |
| f | 4 | 81 | 44 |
| g | 4 | 80 | 42 |
| h | 4 | 72 | 34 |
| i | 4 | 66 | 28 |
| k | 4 | 80 | 46 |
| l | 4 | 77 | 42 |
| m | 4 | 69 | 39 |
| n | 4 | 53 | 25 |

Series (6): Data for practical application of the sol/gel mixtures in which gel VII was used

| | proportions | | tensile | elongation at | M at 300% elonga- | tear propagation |

Series (6): Data for practical application of the sol/gel mixtures in which gel VII was used

| Experiment | gel type | sol type | of mixture sol:gel | ML 1 + 4 (ME) | test mixture | MS$_5$ (min) | strength (mPa) | break (%) | tion (mPa) | resistance (N) |
|---|---|---|---|---|---|---|---|---|---|---|
| a | VII | mercap- | 85:15 | 49 | 6 | 11 | 18.0 | 390 | 13.8 | 170 |
| b | VII | tan | 75:25 | 54 | 6 | 11 | 17.0 | 390 | 13.7 | 177 |
| c | VII | regulat- | 50:50 | 70 | 6 | 8 | 18.2 | 400 | 14.0 | 163 |
| d | VII | ed | 25:75 | 93 | 6 | 8 | 16.6 | 350 | 13.9 | 144 |

| Experiment | test mixture | relaxation (%) | Swelling after extrusion (%) |
|---|---|---|---|
| a | 4 | 80 | 45 |
| b | 4 | 78 | 43 |
| c | 4 | 70 | 36 |
| d | 4 | 59 | 25 |

Series (7): Data for practical application of the sol/gel mixtures in which gel VIII was used

| Experiment | Gel type | sol type | Proportions of mixture sol:gel | ML 1 + 4 (ME) | Test mixture | tensile strength (mPa) | elongation at break (%) | M at 300% elongation (MPa) | tear propagation resistance (N) |
|---|---|---|---|---|---|---|---|---|---|
| a | VIII | mercap- | 100:0 | 45 | 5 | 19.1 | 440 | 12.3 | 160 |
| b | VIII | tan | 75:25 | 57 | 5 | 20.2 | 480 | 11.5 | 187 |
| c | VIII | regulat- ed | 50:50 | 67 | 5 | 17.6 | 420 | 12.6 | 168 |

| experiment | test mixture | relaxation (%) | swelling after extrusion (%) |
|---|---|---|---|
| a | 3 | 61 | 41 |
| b | 3 | 50 | 26 |

Comparison series (1): Conditions for preparation of n-DDM-regulated and EGDM-cross-linked gels (I to III) in which the quantity of cross linking agent was varied and which were mixed with sol polymers (mixtures a to h) and then tested for their properties for practical application

| experiment | discontinuous | continuous | EGDM | n-DDM | temperature (°C.) | conversion (%) | gel content in toluene (%) |
|---|---|---|---|---|---|---|---|
| I | x | — | 2.5 | 0.30 | 44 | 80 | 70 |
| II | x | — | 5.0 | 0.30 | 44 | 80 | 83 |
| III | x | — | 7.5 | 0.30 | 44 | 80 | 92 |

Comparison series (2): Conditions for preparation of n-DDM-regulated and EDGM-cross-linked gels (IV to VI) in which the quantity of regulating agent was varied and which were mixed with sol polymers (mixtures a to k) and then tested for their properties for practical application

| experiment | discontinuous | continuous | EDGM | n-DDM | temperature (°C.) | conversion (%) | gel content in toluene (%) |
|---|---|---|---|---|---|---|---|
| IV | x | — | 5.0 | 0.20 | 44 | 80 | 89 |
| V | x | — | 5.0 | 0.35 | 44 | 80 | 81 |
| VI | x | — | 5.0 | 0.40 | 44 | 80 | 82 |

Comparison series (1): Data for practical application of the sol/gel mixtures in which gels I, II and III were used.

| Experiment | gel type | sol type | Proportions of mixture sol:gel | ML 1 + 4 (ME) | test mixture | MS$_5$ (min) | tensile strength (mPa) | elongation at break (%) | M at 300% elongation | tear propagation resistance (N) |
|---|---|---|---|---|---|---|---|---|---|---|
| a | I | mercap- | 100:0 | 39 | 6 | 11 | 16.2 | 340 | — | 131 |
| b | I | tan | 75:25 | 57 | 6 | 11 | 16.0 | 320 | — | 151 |
| c | I | regulat- | 50:50 | 78 | 6 | 8 | 14.5 | 270 | — | 137 |
| d | I | ed | 25:75 | 95 | 6 | 6 | 13.7 | 240 | — | 119 |
| e | II | mercap- | 75:25 | 52 | 6 | 11 | 14.9 | 310 | — | 132 |
| f | II | tan | 50:50 | 65 | 6 | 8 | 13.0 | 270 | — | 128 |
| g | II | regulat- | 25:75 | 85 | 6 | 4 | 14.5 | 250 | — | 121 |

-continued

Comparison series (1): Data for practical application of the sol/gel mixtures in which gels I, II and III were used.

| | | | | | | | | | | |
|---|---|---|---|---|---|---|---|---|---|---|
| h | III | Mercap- ed | 75:25 | 51 | 6 | 12 | 16.0 | 330 | — | 115 |
| i | III | tan | 50:50 | 68 | 6 | 8 | 10.2 | 230 | — | 112 |
| k | III | regulat- ed | 25:75 | 87 | 6 | 7 | 10.4 | 210 | — | 95 |

| experiment | test mixture | relaxation (%) | swelling after extrusion (%) |
|---|---|---|---|
| b | 4 | >80 | 39 |
| c | 4 | 80 | 35 |
| d | 4 | 76 | 33 |
| e | 4 | 80 | 46 |
| f | 4 | 70 | 35 |
| g | 4 | 66 | 24 |
| h | 4 | 78 | 47 |
| i | 4 | 66 | 32 |
| k | 4 | 60 | 22 |

Comparison series (2): Data for practical application of the sol/gel mixtures in which gels IV, V and VI were used

| experiment | gel type | sol type | proportions of mixture sol:gel | ML 1 + 4 (ME) | test mixture | MS$_5$ (min) | tensile strength (mPa) | elongation at break (%) | M at 300% elongation (mPa) | tear propagation resistance (N) |
|---|---|---|---|---|---|---|---|---|---|---|
| a | IV | mercap- | 100:0 | 39 | 6 | 11 | 16.2 | 340 | — | 131 |
| b | IV | tan | 75:25 | 57 | 6 | 12 | 15.6 | 320 | — | 132 |
| c | IV | regulat- | 50:50 | 82 | 6 | 4 | 14.2 | 270 | — | 131 |
| d | IV | ed | 25:75 | 121 | 6 | 3 | 12.0 | 180 | — | 137 |
| e | V | mercap- | 75:25 | 55 | 6 | 11 | 15.1 | 300 | — | 139 |
| f | V | tan | 50:50 | 68 | 6 | 8 | 15.7 | 300 | — | 126 |
| g | V | regulated | 25:75 | 94 | 6 | 4 | 13.7 | 230 | — | 114 |
| h | VI | mercap- | 75:25 | 51 | 6 | 11 | 16.3 | 330 | — | 144 |
| i | VI | tan | 50:50 | 63 | 6 | 9 | 14.5 | 290 | — | 119 |
| k | VI | regulated | 25:75 | 79 | 6 | 7 | 11.8 | 240 | — | 116 |

| experiment | test mixture | relaxation (%) | swelling after extrusion (%) |
|---|---|---|---|
| b | 4 | 80 | 41 |
| c | 4 | 72 | 27 |
| d | 4 | 66 | 17 |
| e | 4 | >80 | 43 |
| f | 4 | 74 | 37 |
| g | 4 | 67 | 25 |
| h | 4 | >80 | 45 |
| i | 4 | 73 | 38 |
| k | 4 | 65 | 29 |

Series (8): Comparison of the sol/gel mixtures according to the invention with those from DE-OS 3,234,318 (comparison example)

Conditions for preparation of the gel and sol components

| Example | Gel component sulphur | DBDTC | EGDM | conversion | TETD | sol component sulphur | TETD | conversion | TETD of the sol/gel mixture |
|---|---|---|---|---|---|---|---|---|---|
| 1 | 0.5 | 0.13 | — | 93 | 2.0 | — | — | 65 | 0.2 |
| | corresponds to Experiment II in Series 2) | | | | | xanthogen disulphide-regulated | | | 0.4 |
| | | | | | | | | | 0.6 |
| 2 | 0.5 | 1.0 | 5.0 | 80 | 3.0 | — | — | 65 | 0.45 |
| | corresponds to experiment II in Series 4) | | | | | mercaptan-regulated | | | 0.75 |
| | | | | | | | | | 1.5 |
| comparison example | 0.8 | 0.9 | 4.0 | 78 | 0.7 | 0.6 | 0.65 | 65 | 2.2 |
| | | | | | | | | | 2.5 |

| Series (8): Comparison of the sol/gel mixtures according to the invention with those of DE-OS 3,234,318 (comparison example) Data for practical application | | | | |
|---|---|---|---|---|
| Proportions of mixture sol:gel | test mixture | tensile strength (mPa) | M at 300% elongation (mPa) | surface quality[1] of the extrudates (test mixture 4) |
| 90:10 | 5 | 20.4 | 13.0 | 2 |
| 80:20 | 5 | 20.4 | 13.0 | 2 |
| 70:30 | 5 | 19.7 | 12.9 | 1 |
| 85:15 | 6 | 18.5 | 13.7 | 3 |
| 75:25 | 6 | 18.8 | 13.2 | 2 |
| 50:50 | 6 | 18.5 | 14.2 | 1 |
| 80:20 | 5* | 19.5 | 10.5 | 5 |
| 50:50 | 5* | 18.5 | 11.5 | 4 |

[1] 1 = very good surface quality
5 = poor surface quality
The assessment includes roughness, presence of cracks and dimensional stability of the extrudates
*without ethylene thiourea.

We claim:

1. Elastomeric mass of (a) polychloroprene sol and (b) polychloroprene gel in proportions in the range of 95:5 to 25:75% by weight, in which
   the polychloroprene sol (a) is free from sulphur and the polychloroprene gel (b) is a sulfur-containing polychloroprene having
   (i) a sulphur-content of from 0.05 to 2% by weight, based on the monomers,
   (ii) a gel content, determined in toluene, of from 40 to 100%, and
   (iii) a swelling index, determined with toluene, of the gel component of from 5 to 90,
   the polychloroprene (b) having xanthate or carbamate functions obtained with $6.24 \times 10^{-4}$ to $3.12 \times 10^{-2}$ mol, based on 100 g of the monomers, of xanthate or with $2.2 \times 10^{-4}$ to $2.2 \times 10^{-2}$ mol, based on 100 g of the monomers, of carbamate,
   said xanthates or dithiocarbamates having anions corresponding to the formula

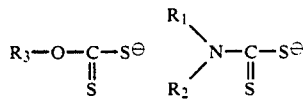

wherein
$R_1$, $R_2$ and $R_3$ denote an optionally substituted alkyl, cycloalkyl or aryl group and
$R_1$ and $R_2$ may also combine with the nitrogen atom to form a ring optionally containing at least one further hetero atom.

2. Elastomeric mass according to claim 1, characterised in that from 0.05 to 5.0% by weight, in particular from 0.1 to 3.0% by weight of sodium dibutyl dithio carbamate, based on the quantity of monomers of the gel polymers, or a corresponding molar quantity of some other dithio carbamate or from 0.1 to 5.0% by weight, in particular from 0.5 to 3.0% by weight of potassium ethyl xanthate, based on the quantity of monomers of the gel polymer, or a corresponding molar quantity of some other xanthate is used.

3. Elastomeric mass according to claim 1, wherein $R_1$ and $R_2$ denotes $C_1$-$C_4$ alkyl and $R_3$ denotes $C_1$-$C_8$ alkyl or 2,2-(2,4-dioxapentamethylene)-butyl.

4. Elastomeric mass according to claim 1 in which the dithio carbamates and xanthates are used in the form of their ammonium salts or alkali metal salts.

* * * * *